(12) United States Patent
Kim

(10) Patent No.: US 10,489,996 B2
(45) Date of Patent: Nov. 26, 2019

(54) GATEWAY AND METHOD FOR CONTROLLING GATEWAY

(71) Applicants: Hyundai Motor Company, Seoul (KR); Kia Motors Corporation, Seoul (KR)

(72) Inventor: Jeong Hwan Kim, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 153 days.

(21) Appl. No.: 15/712,449

(22) Filed: Sep. 22, 2017

(65) Prior Publication Data

US 2018/0174379 A1    Jun. 21, 2018

(30) Foreign Application Priority Data

Dec. 15, 2016  (KR) .......................... 10-2016-0171736

(51) Int. Cl.
*G07C 5/08* (2006.01)
*H04L 12/28* (2006.01)

(52) U.S. Cl.
CPC ........... *G07C 5/085* (2013.01); *G07C 5/0808* (2013.01); *G07C 5/0816* (2013.01)

(58) Field of Classification Search
USPC ....................................................... 701/31.8
See application file for complete search history.

(56) References Cited

U.S. PATENT DOCUMENTS

| | | | |
|---|---|---|---|
| 7,801,162 B2* | 9/2010 | Jeon ........................ | H04L 12/66 370/402 |
| 10,051,091 B2* | 8/2018 | Kim ........................ | H04L 69/08 |
| 2011/0264974 A1* | 10/2011 | Werner ..................... | H04L 1/20 714/746 |
| 2017/0361808 A1* | 12/2017 | Haga ....................... | B60R 25/307 |
| 2018/0189483 A1* | 7/2018 | Litichever ............ | H04L 67/2823 |

FOREIGN PATENT DOCUMENTS

KR    10-2010-0020253 A    2/2010

\* cited by examiner

*Primary Examiner* — Tyler D Paige
(74) *Attorney, Agent, or Firm* — Morgan, Lewis & Bockius LLP

(57) ABSTRACT

A gateway may include an error factor classifying device that determines a cause factor that causes an error; an error counter device that checks an error counter; and a control mode determining device that transmits a default value for each error state based on the cause factor, which causes the error, and the error counter.

7 Claims, 4 Drawing Sheets

GATEWAY AND METHOD FOR CONTROLLING GATEWAY

CROSS-REFERENCE(S) TO RELATED APPLICATIONS

The present application claims priority to Korean Patent Application No. 10-2016-0171736, filed on Dec. 15, 2016, the entire contents of which is incorporated herein for all purposes by this reference.

BACKGROUND OF THE INVENTION

Field of the Invention

The present invention relates to a gateway and a gateway control method, and to a technology of sharing real-time information of a receiving-side control device through classifying errors in a vehicle network and counting the errors.

Description of Related Art

With the development of a vehicle technology, a variety of functions are provided to a driver to improve comfort and convenience.

Generally, electronic control units (ECUs) are mounted on a vehicle to perform functions that a vehicle provides, and the ECUs that need to operate in conjunction with each other are connected through a wire. As the number of ECUs increases, wire connection becomes inevitably complicated. As the wire connection becomes complicated, the total amount of wires increases.

Accordingly, in the present case is difficult to find the cause of a failure when a vehicle is diagnosed, and the total weight of the vehicle increases.

In addition, when a vehicle design is changed, hardware associated with the changed vehicle design needs to be modified. In the present case, the ECUs are complicatedly connected to each other through the wires. Furthermore, it is difficult to ensure a design margin due to the new disposition of the wires required when the vehicle design is changed.

To solve the above issue, a vehicle network for implementing networking between the ECUs through a communication bus is provided. Controller area network (CAN) communication may be used as one of vehicle networks. According to the CAN communication, all ECUs included in a vehicle performs inter-networking by use of a CAN protocol while connected to each other through a CAN bus.

When the number of ECUs connected to CAN communication is small, a communication environment may be stably provided because the amount of data exchanged between the ECUs is small and the number of nodes of the CAN bus is small. However, as the function of the vehicle is upgraded, the case where the ECUs for implementing new functions are connected to the vehicle network may increase, and thus the amount of data transmitted or received through the communication bus corresponding to the CAN bus has increased.

Generally, the utilization of a network may be determined according to Equation 1. It is preferable to limit the utilization of the CAN bus wherein the utilization of the CAN bus is up to less than 30% of a usable value.

Bus utilization=maximum transmitted bits per unit time/transmittable bits per unit time  [Equation 1]

The reason that the maximum utilization of the whole network is limited to 30% or less is that the latency time of a message caused by arbitration is negligibly small in a network with utilization of 30% or less. When the network utilization exceeds 30%, the time needed for the arbitration increases due to frequent collisions between messages to occupy the CAN bus. In the present case, to ensure priority, a message with low priority is transmitted later than a message with high priority. Accordingly, the message with low priority has more latency time than the message with high priority. When the latency time increases, the predictability on operating time of the whole system decreases, and thus, it is difficult to ensure a normal operation of a system.

Accordingly, to increase data transmission efficiency and reliability of the vehicle network, it is a need to develop a technique for monitoring and diagnosing the transmission status of a message.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

An aspect of Various aspects of the present invention are directed to providing a gateway that shares real-time information with a transmitting-side control device of a domain and a receiving-side control device based on data of an error state of a vehicle network, wherein the receiving-side control device properly operates according to each error situation of the vehicle network, and a gateway control method.

Other aspects and advantages of the present invention will be understood from the following description, and will be apparently understood from various embodiments of the present invention. It will be easily understood that the aspects and advantages of the invention are realized by means and combinations described in the appended claims.

According to various aspects of the present invention, a gateway includes an error factor classifying device configured to determine a cause factor, which causes an error, with reference to a data range defined in a received data frame; an error counter device configured to count the number of occurrences of the error; and a control mode determining device configured to generate a default value for each error state based on the cause factor, which causes the error, and the counted number of occurrences of the error.

The error factor classifying device may classify the error factor to predict a network state of a vehicle for each error situation.

The error factor classifying device may monitor error state information in an error state indicator (ESI) defined in the data frame.

The error factor classifying device may classify the error state as an error active state, when a value of the data range defined in the data frame is '0'. The error factor classifying device may classify the error state as an error passive state, when the value of the data range defined in the data frame is '1'.

The error counter device may classify the error state as an error active state, an error passive state, or a bus-off state, based on a value obtained by counting the number of occurrences of the error.

According to another aspect of the present invention, a method for controlling a gateway includes determining a cause factor, which causes an error, with reference to a data range defined in a received data frame; counting the number of occurrences of the error; and generating a default value for each error state based on the cause factor, which causes the error, and the counted number of occurrences of the error.

Generation of the default value may include monitoring error state information in an ESI defined in the data frame.

Generation of the default value may include classifying the error state as an error active state, when a value of the data range defined in the data frame is '0'; and classifying the error start as an error passive state, when the value of the data range defined in the data frame is '1'.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
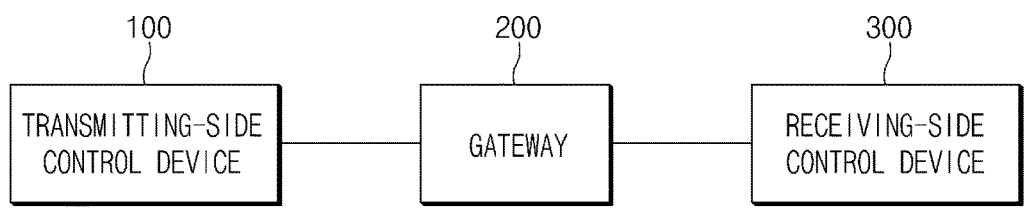
FIG. 1 is a block diagram for schematically describing a gateway, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only those exemplary embodiments, but also various alternatives, modifications, equivalents and other embodiments, which may be included within the spirit and scope of the invention as defined by the appended claims.

As used herein, the term "and/or" includes any and all combinations of one or more of the associated listed items. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the singular terms "a," "an" and "the" are intended to include the plural forms as well, unless the context clearly indicates otherwise. Furthermore, it will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Below, embodiments will be described in detail with reference to accompanying drawings.

A gateway may include a control device, a communication device, an input and output device, various types of memories, an application, an operating system (OS), and the like.

FIG. 1 is a block diagram for schematically describing a gateway, according to an exemplary embodiment of the present invention.

Referring to FIG. 1, a gateway control device includes a transmitting-side control device 100, a gateway 200, and a receiving-side control device 300.

The transmitting-side control device 100 periodically transmits a message to the gateway 200 through a high-speed CAN network, a low-speed CAN network, and the like of a vehicle.

After receiving a CAN protocol-based message transmitted through a communication bus from the transmitting-side control device 100 and performing an error check, the gateway 200 transmits the received message to the receiving-side control device 300.

In detail, the gateway 200 classifies error factors and checks an error counter wherein the receiving-side control device 300 and the transmitting-side control device 100 of each domain predict a network state of a vehicle in a network of the vehicle for each error situation in advance.

A method for classifying the error factors and checking the error counter will be described in detail in FIG. 2.

Herein, a message based on the CAN protocol has an identifier (ID), and each control device distinguishes a message based on the ID of each message and determines a priority of the corresponding message. The latency time specified by the CAN protocol is defined on each message, and the minimum time (Min) and the maximum time (Max) are defined on each latency time. Accordingly, the message based on the CAN protocol needs to be transmitted to the receiving-side control device 300 through a communication bus within the latency time defined on the corresponding message.

The receiving-side control device 300 receives the message, on which the error check is performed, from the gateway 200.

Figure 2:
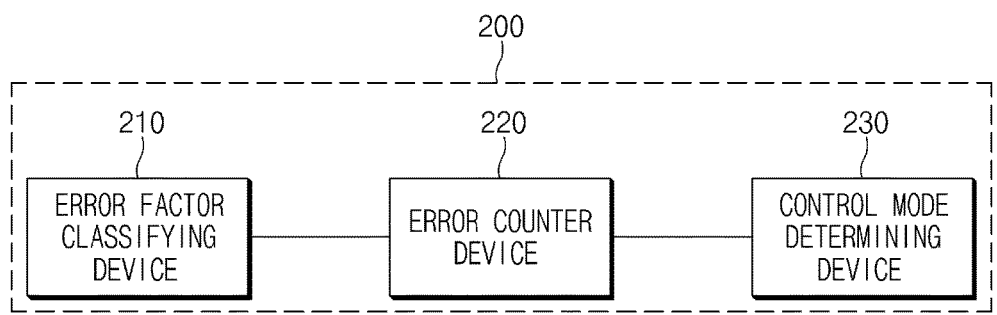
FIG. 2 is a block diagram for describing an element in a gateway, according to an exemplary embodiment of the present invention.

FIG. 2 is a block diagram for describing an element in a gateway, according to an exemplary embodiment of the present invention.

Referring to FIG. 2, the gateway 200 includes an error factor classifying device 210, an error counter device 220, and a control mode determining device 230.

The error factor classifying device 210 determines a cause factor which causes an error.

The error factor classifying device 210 defines an error cause in a value of a data range (actual data) defined within a data frame.

That is, when a failure (e.g., disconnection or short) of a communication line connected to the transmitting-side control device 100 occurs, or when a failure of the transmitting-side control device 200 occurs, various errors (e.g., 'Bit Error', 'ACK Error', 'Stuff Error', 'CRC Error', 'Form Error', 'Wire Error', 'Alive Counter Error', and the like) occur. The error factor classifying device 210 defines the various errors.

For example, '000' may be defined as 'No Error', '001' may be defined as 'Bit Error', '010' may be defined as 'ACK Error', '011' may be defined as 'Stuff Error', '100' may be defined as 'CRC Error', '101' may be defined as 'Form Error', '110' may be defined as 'Wire Error', and '111' may be defined as 'Alive Counter Error'.

In addition, the error factor classifying device 210 may monitor error state information in an error state indicator (ESI) defined in the data frame.

For example, when the value of the data range defined in the data frame is '0', the gateway 200 may classify an error state as an error active state. When the value of the data range is '1', the gateway 200 may classify the error state as an error passive state.

The error counter device 220 checks an error counter, and the error counter includes a 'Transmit Error Counter' and a 'Receive Error Counter'.

The error counter device 220 may classify the error state as an error active state, an error passive state, or a bus-off state based on an error counter condition.

Herein, the error active state may be defined as a stable state when the number of error inducing factors between vehicle networks is smaller than the number of error inducing factors of a predetermined value. The error passive state may be defined as an unstable state when the number of error inducing factors between vehicle networks increases to a value greater than the number of error inducing factors in the error active state. The bus-off state may be a state in which data is not transmitted and received because the vehicle network does not operate due to the error inducing factors.

In addition, the Transmit Error Counter may indicate an error inducing factor transmitted from the transmitting-side control device 100. The Receive Error Counter may indicate an error inducing factor that the gateway 200 receives.

Furthermore, the gateway 200 determines the number of errors by checking the error counter. A warning interrupt, a passive interrupt, an urgent interrupt, and a bus-off interrupt are set based on references (tendency) specified according to an increase or decrease in the number of errors. A specific default value may be transmitted in response to the references.

In detail, when the Receive Error Counter is not greater than 128 and the Transmit Error Counter is not greater than 128, the error state becomes the error active state. When the Receive Error Counter is not less than 127 and the Transmit Error Counter is not less than 127, the error state becomes the error passive state. When the Transmit Error Counter is not less than 255, the error state becomes the bus-off state and communication is disabled in the bus-off state.

The control mode determining device 230 transmits a default value for each error state, which is based on a control mode including 3 steps, to the receiving-side control device 300 based on a cause factor, which causes an error, determined from the error factor classifying device 210 and an error counter determined from the error counter device 220.

First, when '000', '001', '010', '011', '100', or '101' of error cause factors occurs in actual data when the gateway 200 determines the error state as the error active state, the control mode determining device 230 does not transmit a default value to the receiving-side control device 300 without performing a separate control.

However, when '110' of the error cause factors occurs in actual data, the control mode determining device 230 stores the error cause factor in a diagnostic trouble code (DTC). When '111' of the error cause factors occurs in actual data, the control mode determining device 230 transmits a specific default value to the receiving-side control device 300 in view of continuity of the error cause factors.

Next, when '000', '001', '010', '011', '100', or '101' of error cause factors occurs in actual data when the gateway 200 determines the error state as the error active state or the error passive state, the control mode determining device 230 processes the corresponding error cause factor. When '110' of the error cause factors occurs in actual data, the control mode determining device 230 stores the error cause factor in a DTC and turns on a warning lamp. When '111' of the error cause factors occurs in actual data, the control mode determining device 230 transmits a specific default value to the receiving-side control device 300 in view of continuity of the error cause factors.

Next, when '000', '001', '010', '011', '100', or '101' of error cause factors occurs in actual data when the gateway 200 determines the error state as the error passive state, the control mode determining device 230 processes the corresponding error cause factor. When '110' of the error cause factors occurs in actual data, the control mode determining device 230 stores the error cause factor in a DTC and flickers a warning lamp. When '111' of the error cause factors occurs in actual data, the control mode determining device 200 transmits a specific default value to the receiving-side control device 300 in view of sporadicity of the error cause factors.

Figure 3:
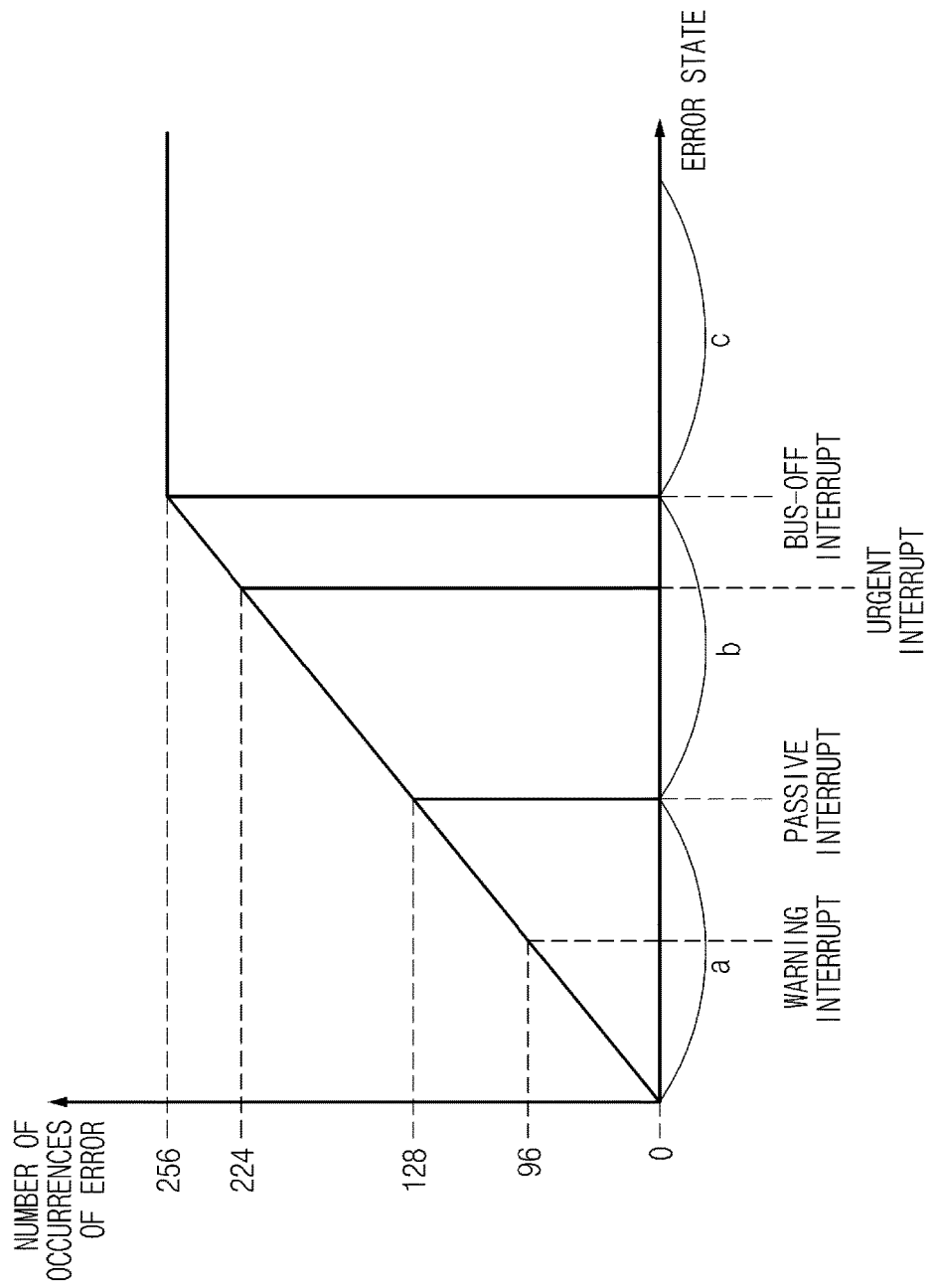
FIG. 3 is a graph for describing a method for controlling a gateway based on the number of occurrences of an error in a gateway and an error state, according to an exemplary embodiment of the present invention.

FIG. 3 is a graph for describing a method for controlling a gateway based on the number of times of occurrences of an error in a gateway and an error state, according to an exemplary embodiment of the present invention.

Referring to FIG. 3, the gateway may classify an error state as an error active state 'a', an error passive state 'b', or a bus-off state 'c' based on an error counter condition.

Firstly, the error active state 'a' may correspond to the case in which a Receive Error Counter is not greater than 128 and a Transmit Error Counter is not greater than 128. The error active state 'a' may be classified with reference to the Receive Error Counter or the Transmit Error Counter of a warning interrupt that is 96, Next, the error passive state 'b' may correspond to the case in which the Receive Error Counter is not less than 127 and the Transmit Error Counter is not less than 127. The error passive state 'b' may be classified with reference to the Receive Error Counter or the Transmit Error Counter of an urgent interrupt that is 224. The bus-off state 'c' may be applied to the case in which the Transmit Error Counter is not less than 255.

Figure 4:
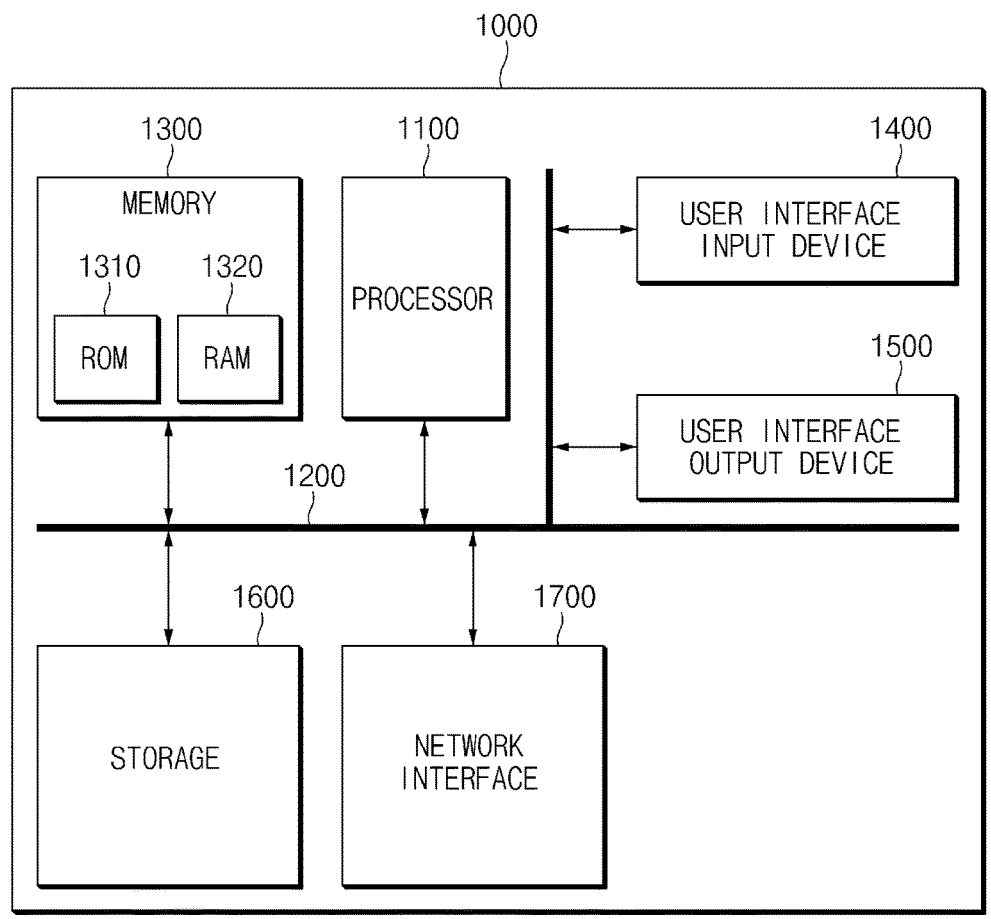
FIG. 4 is a block diagram illustrating a computing system that performs a gateway control method, according to an exemplary embodiment of the present invention.

FIG. 4 is a block diagram illustrating a computing system that performs a gateway control method, according to an exemplary embodiment of the present invention.

Referring to FIG. 4, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing device (CPU) or a semiconductor device for processing instructions stored in the memory 1300 and or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the embodiments referenced in the specification may be directly implemented with a hardware module, a software module, or combinations thereof, executed by the processor 1100. The software module may reside on a storage medium (e.g., the memory 1300 and/or the storage 1600) including a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The present invention may process an error based on state information of a transmission message for each control device connected to a specific domain by receiving error state information in a data frame range and by classifying error generating cause factor or generating an error counter.

In addition, a receiving-side control device preemptively recognizes the error situation by predicting an error situation of a transmitting-side control device in advance through a gateway, and thus the present invention may prevent a function of a vehicle to be lower.

Meanwhile, the above-mentioned method of the present invention may be implemented as a computer program. Codes and code segments constituting the computer program may be readily inferred by a computer programmer in the field. In addition, the computer program may be stored in computer-readable recording media (information storage media) and may be read and executed by a computer, implementing the method of the present invention. In addition, the recording media includes all types of recording media that are computer-readable.

The present invention may process an error based on state information of a transmission message for each control device connected to a specific domain by receiving error state information in a data frame range and by classifying error generating cause factor or generating an error counter.

In addition, a receiving-side control device preemptively recognizes the error situation by predicting an error situation of a transmitting-side control device in advance through a gateway, and thus the present invention may prevent a function of a vehicle to be lower.

For convenience in explanation and accurate definition in the appended claims, the terms "upper", "lower", "internal", "outer", "up", "down", "upwards", "downwards", "front", "back", "rear", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various alternatives and modifications thereof. It is intended that the scope of the invention be defined by the Claims appended hereto and their equivalents.

What is claimed is:

1. A gateway comprising a processor, wherein the processor is configured to:
   receive a message from transmitting-side control device;
   determine a cause factor, which cause an error;
   determine an error state based on number of occurrence of the error; and
   determine a control mode corresponding to the error based on the cause factor and the error state,
   wherein the processor classifies the cause factor to predict a network state of a vehicle for each error situation.

2. The gateway of claim 1, wherein the processor is configured to monitor error state information in an error state indicator (ESI) defined in a data frame.

3. The gateway of claim 1, wherein the processor classifies the error state as an error active state, when a value of a data range defined in a data frame is '0', and
   wherein the processor classifies the error state as an error passive state, when the value of the data range defined in the data frame is '1'.

4. The gateway of claim 1, wherein the processor classifies the error state as an error active state, an error passive state, or a bus-off state, based on a value obtained by counting a number of times of occurrences of the error.

5. A method for controlling a gateway, the method comprising:
   receiving, by a processor, a message from transmitting-side control device;
   determining, by the processor, a cause factor, which cause an error;
   determining, by the processor, an error state based on number of occurrence of the error; and
   determining by the processor, a control mode corresponding to the error based on the cause factor and the error state,
   wherein the processor classifies the cause factor to predict a network state of a vehicle for each error situation.

6. The method of claim 5, further including:
   monitoring, by the processor, error state information in an error state indicator (ESI) defined in a data frame.

7. The method of claim 5, further including:
   classifying, by the processor, the error state as an error active state, when a value of a data range defined in a data frame is '0'; and
   classifying by the processor, the error state as an error passive state, when the value of the data range defined in the data frame is '1'.

* * * * *